(12) United States Patent
Puhala et al.

(10) Patent No.: US 10,087,306 B2
(45) Date of Patent: Oct. 2, 2018

(54) ADDITIVE FOR SILICA REINFORCED RUBBER FORMULATIONS

(71) Applicants: Aaron S. Puhala, Kent, OH (US); Adeyemi A. Adepetun, Cleveland, OH (US)

(72) Inventors: Aaron S. Puhala, Kent, OH (US); Adeyemi A. Adepetun, Cleveland, OH (US)

(73) Assignee: Flow Polymers, LLC, Cleveland, OH (US)

( * ) Notice: Subject to any disclaimer, the term of this patent is extended or adjusted under 35 U.S.C. 154(b) by 155 days.

(21) Appl. No.: 14/993,687

(22) Filed: Jan. 12, 2016

(65) Prior Publication Data

US 2016/0208076 A1    Jul. 21, 2016

Related U.S. Application Data

(60) Provisional application No. 62/103,809, filed on Jan. 15, 2015.

(51) Int. Cl.

| | | |
|---|---|---|
| *C08L 9/00* | (2006.01) | |
| *C08K 5/05* | (2006.01) | |
| *C08K 5/057* | (2006.01) | |
| *B60C 1/00* | (2006.01) | |
| *C08K 3/36* | (2006.01) | |
| *B60C 9/02* | (2006.01) | |
| *B60C 11/00* | (2006.01) | |
| *B60C 15/00* | (2006.01) | |
| *C08K 5/00* | (2006.01) | |

(52) U.S. Cl.
CPC ............ *C08K 5/057* (2013.01); *B60C 1/0016* (2013.01); *B60C 9/02* (2013.01); *B60C 11/0008* (2013.01); *B60C 15/00* (2013.01); *C08K 3/36* (2013.01); *C08K 5/0025* (2013.01)

(58) Field of Classification Search
CPC .......... C08K 5/057; C08K 5/053; C08K 5/05; C08L 9/00
See application file for complete search history.

(56) References Cited

U.S. PATENT DOCUMENTS

| | | | |
|---|---|---|---|
| 3,055,956 A | 9/1962 | Paulsen | 585/320 |
| 3,317,458 A | 5/1967 | Clas et al. | 523/334 |
| 3,686,113 A | 8/1972 | Burke, Jr. | 523/210 |
| 3,767,605 A | 10/1973 | Gerlicher | 523/334 |
| 3,768,537 A | 10/1973 | Hess et al. | 152/330 |
| 3,907,734 A | 9/1975 | Broeck et al. | 260/23.7 |
| 4,481,329 A | 11/1984 | Ambler et al. | 524/501 |
| 4,482,657 A | 11/1984 | Fischer et al. | 523/334 |
| 4,789,701 A * | 12/1988 | Taylor | C08K 5/0091 524/381 |
| 5,227,425 A * | 7/1993 | Rauline | B60C 1/0016 524/493 |
| 5,405,897 A | 4/1995 | Segatta et al. | 524/290 |
| 5,475,123 A * | 12/1995 | Bos | C07C 29/70 556/130 |
| 5,901,766 A | 5/1999 | Sandstrom et al. | 152/209 |
| 5,985,953 A | 11/1999 | Lightsey et al. | 523/212 |
| 6,025,415 A | 2/2000 | Scholl | 523/213 |
| 6,221,953 B1 | 4/2001 | Sandstrom et al. | 524/518 |
| 6,242,523 B1 | 6/2001 | Blok et al. | 524/495 |
| 6,306,949 B1 * | 10/2001 | Materne | C08K 5/548 152/209.4 |
| 6,323,260 B1 | 11/2001 | Koski | 427/221 |
| 6,407,153 B1 | 6/2002 | Hellens | 524/188 |

(Continued)

FOREIGN PATENT DOCUMENTS

| | | | |
|---|---|---|---|
| DE | 1188797 | 3/1965 | ............... C08K 3/36 |
| FR | 2588008 | 9/1985 | ............... C08L 9/10 |

(Continued)

OTHER PUBLICATIONS

SU 187996 A (Dec. 31, 1966), Frenkel et al. Machine translation.*
Extended European Search Report for EPO Application 16151572.1-1308 dated Jun. 9, 2016.

*Primary Examiner* — Rip A Lee
(74) *Attorney, Agent, or Firm* — Alvin T. Rockhill

(57) ABSTRACT

This invention is based upon the discovery that the silica compounding additives of this invention can be included in silica reinforced rubber formulations to increase the low strain dynamic stiffness exhibited by the rubber composition without a substantial increase in the cured compound hysteresis. This increase in stiffness allows for use of process aids that would otherwise result in an unacceptable further reduction in low strain dynamic stiffness. The present invention specifically discloses a rubber formulation which is comprised of (1) a rubbery polymer, (2) a reinforcing silica, and (3) a silica compounding additive of the structural formula:

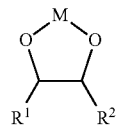

wherein M represents a divalent metal, and wherein $R^1$ and $R^2$ can be the same or different and are selected from the group consisting of hydrogen atoms, alkyl groups, alkylene groups, hydroxyl substituted alkyl or alkylene groups, amine substituted alkyl or alkylene groups and thiol substituted alkyl or alkylene groups.

23 Claims, No Drawings

(56) References Cited

U.S. PATENT DOCUMENTS

| | | | |
|---|---|---|---|
| 6,420,456 B1 | 7/2002 | Koski | 523/213 |
| 6,433,064 B1 | 8/2002 | Gorl et al. | 524/492 |
| 6,433,065 B1 | 8/2002 | Lin et al. | 524/492 |
| 6,465,670 B2 | 10/2002 | Thise et al. | 556/400 |
| 6,525,133 B1 | 2/2003 | Wideman et al. | 524/848 |
| 6,537,612 B1 | 3/2003 | Koski | 427/221 |
| 6,608,145 B1 | 8/2003 | Lin et al. | 525/332.6 |
| 8,357,733 B2 | 1/2013 | Wallen et al. | 523/213 |
| 2004/0054062 A1* | 3/2004 | Zanzig | C08L 9/06 524/493 |
| 2008/0146725 A1 | 6/2008 | Frank | |
| 2013/0123418 A1 | 5/2013 | Da Silva | |

FOREIGN PATENT DOCUMENTS

| | | | | |
|---|---|---|---|---|
| FR | 2588874 | | 10/1985 | C08J 3/22 |
| FR | 2804119 | | 7/2001 | B01D 12/00 |
| GB | 2360784 | A | 10/2001 | |
| SU | 187996 | A * | 12/1966 | |
| WO | WO 2003/091314 | | 11/2003 | C08G 77/28 |
| WO | WO 2006/076670 | | 7/2006 | B60C 1/00 |

\* cited by examiner

ADDITIVE FOR SILICA REINFORCED RUBBER FORMULATIONS

This application claims benefit of U.S. Provisional Patent Application Ser. No. 62/103,809, filed on Jan. 15, 2015. The teachings of U.S. Provisional Patent Application Ser. No. 62/103,809 are incorporated herein by reference in their entirety.

BACKGROUND OF THE INVENTION

The use of silica as a reinforcing agent in rubber formulations has grown significantly in importance in recent years. In fact, today silica is widely used in rubber formulations as a replacement, or more typically a partial replacement, for carbon black in rubber articles, such as tires. This is because silica reinforcement offers numerous benefits over conventional compounding with carbon black. For instance, U.S. Pat. No. 5,227,425 indicates that tires made with tread formulations that contain silica exhibit a number of important performance advantages over tires manufactured using carbon black as the filler. More specifically, the utilization of silica in tire tread formulations is believed to (a) lower rolling resistance, (b) provide better traction on wet surfaces and snow, and (c) lower noise generation, when compared with conventional tires filled with carbon black.

Sometimes rubber for tires is supplied by a rubber producer to a tire manufacturer in the form of a masterbatch containing an elastomer, an oil extender, and a filler. The traditional filler has been carbon black in the form of fine particles. These particles have hydrophobic surface characteristics and will therefore disperse easily within the hydrophobic elastomer. In contrast, silica has a very hydrophilic surface and considerable difficulty has been encountered in dispersing silica in the hydrophobic rubbery elastomer.

A number of techniques have been developed to incorporate such reinforcing agents and fillers into the polymer compositions, including both wet and dry blending processes. The incorporation of silica and carbon black as reinforcing agents and/or fillers into rubbery elastomers is far more complex than one might initially believe. One problem in wet blending of silica with latices of such polymers arises from the fact that the hydrophilic silica has a tendency to associate with the aqueous phase and not blend uniformly with the hydrophobic polymer.

To overcome the problems associated with the hydrophilic nature of the silica, U.S. Pat. No. 3,317,458 proposed a process whereby an aqueous solution of silicic acid was treated so as to precipitate silica directly onto the surface of an aqueous carbon black in paste form. One significant limitation of this technique is that the surface of the carbon black is altered thus obviating the utility of the many surface structure characteristics of specialty carbon blacks available to the skilled compounder in designing filled, reinforced polymers for specific end uses.

Attempts have been made to use cationic emulsifiers in an effort to distribute such fillers and/or reinforcing agents in polymeric lattices; notably among them are quaternary alkylated ammonium halides (see German Patent No. 1,188, 797). It has been found, however, that such quaternary ammonium compounds have a tendency to react with the carbon black, dispersing it into the aqueous phase; that limiting the ability to blend carbon black with the polymeric components in the latex. In U.S. Pat. No. 3,686,113, wet silica is treated with oleophilic quaternary ammonium compounds to blend with an aqueous dispersion of an elastomer containing an anionic dispersing agent. In addition to the problem referenced above with carbon black dispersion, unfortunately, such techniques require specific coagulating agents.

Perhaps the most commonly employed practice used commercially is the technique of dry blending either silica, carbon black or both of them into rubber and thermoplastic polymers in a high-shear milling operation. That practice has many limitations. Notable among them include the tendency of the filler particles to agglomerate to each other, resulting in non-uniform dispersion of the filler throughout the polymer constituting the continuous phase. Another problem commonly experienced in such high-shear milling operations is the tendency of the polymers to degrade during milling. This necessitates the use of higher molecular weight polymers, which sometimes require the incorporation of various types of processing aids to facilitate mixing and dispersion of the filler particles into the polymer constituting the continuous phase. The cost associated with the use of such conventional processing aids also increases the manufacturing cost of the polymeric compound or article and can lead to diminished product performance. The use of conventional processing aids has the further disadvantage in that such processing aids may have a negative effect on the cure or end use of the polymer. Such dry blending techniques also result in additional processing costs, in part due to excessive equipment wear caused by the abrasive fillers.

To improve dispersion of the silica during dry mixing, it has been proposed that such compounding operations employ a silica which has been treated with an organosilane coupling agent having dual functionality. Representative of such coupling agents are those well known compounds that include both an organic group, such as an amino alkyl group, a mercaptoalkyl group, or a polysulfidic-bis-organo alkoxy silane group bonded directly to the silicon atom along with a readily hydrolyzable group, such as an alkoxy group as represented by a methoxy group or an ethoxy group, likewise bonded directly to the silicon atom. In those systems, it is generally recognized that the alkoxy group hydrolyzes in the presence of moisture typically found on the surface of the silica to form the corresponding silanol which reacts with or condenses in the presence of the silica surface to bond the silicon atom to the silica surface. The organic groups likewise attached to the silicon atom are thus available for chemical reaction with the polymer matrix during vulcanization. As a result, the polymer matrix may become chemically bonded by means of the coupling agent to the silica surface during cure or vulcanization of the polymer. Problems associated with the use of such silanes during compounding are unpleasant odors, premature curing, and/or scorching.

In an effort to overcome the problems associated with the use of silane coupling agents, it has been proposed in U.S. Pat. No. 5,405,897 to employ phenoxy acidic acid along with a methylene donor in place of the conventional organosilanes. The foregoing patent suggests that the use of such a system provides improved physical properties and reduced viscosity of the melt during compounding.

Various other attempts have been made to overcome the problems associated with wet blending such fillers and/or reinforcing agents with polymer latices. For example, it has been proposed, as described in U.S. Pat. No. 3,055,956 and U.S. Pat. No. 3,767,605 to add carbon black in the form of a slurry directly to an emulsion polymerization process of rubbery polymer, at the latex stage, followed by coagulation and recovery of a rubber-carbon black masterbatch. Such processes work well with carbon black, but fail to incorporate substantial amounts of fine particulate silica. U.S. Pat.

No. 4,481,329 proposes a process for dispersing carbon black and like fillers into concentrated rubber latices by the use of a low molecular weight conjugated diene/carboxylic acid polymer in the form of an alkali metal salt dissolved in water as the dispersing aid or dispersing latex.

U.S. Pat. No. 4,482,657 describes mixtures of silica and synthetic polymers prepared by treating a polymer latex with a dispersion of silica and an alkyl trimethyl ammonium halide in water. The presence of a quaternary ammonium halide in this process necessitates the slow addition of the silica dispersion to prevent premature coagulation. Other elaborate techniques as described in U.S. Pat. No. 3,907,734 where a partitioning agent in the form of a blend of precipitated silica and hydrophobic fumed silica are incorporated into a concentrated polymer latex have been suggested. The fumed silica adsorbs the water, and the resulting solid mixture is dried with removal of the hydrophobic fumed silica to form a free flowing blend of polymer particles coated with precipitated silica. That process is limited to relatively small scale batch system and requires recovery and recycle of the hydrophobic fumed silica. That process fails to incorporate into the polymer the more desirable hydrophobic fumed silica.

U.S. Pat. No. 8,357,733 describes a process for making silica filled rubber masterbatch using silica hydrophobated with a trimethoxy silane coupling agent that is soluble in alcohol-water solution containing at least 70 wt % water. Hydrophobated silica is mixed with latex polymer and incorporated into rubber during the coagulation of the latex. This process has the limitation that it requires that the polymer be an emulsion rather than solution polymerization prepared polymers that may have preferred properties.

Such processes with concentrated latex, as those skilled in the art can readily appreciate, involve complex procedures not only blending the silica with the polymer latex, but also in effecting its recovery when excess silica or carbon black must be employed. Another limitation of such processes is that recovery of the filled polymer directly from the latex stage without filtration and like treatment steps used to remove byproducts from the emulsion polymerization can have deleterious effects on the end use properties of the polymer thus recovered. Such problems can be seen in French Patent 2,558,008 and French Patent 2,558,874. In the first, the addition to a rubber latex of precipitated silica effects coagulation of the rubber polymer. In the second, a stable latex of derivatized silica and a carboxylated butadiene rubber is prepared to add to natural or synthetic elastomer latices. The derivatization of the silica is accomplished by treatment with polyamines, polyethylene amines or non-ionic polyoxyethylene. Such free agents are wholly incompatible with typical coagulation techniques used in the recovery of the emulsion process polymers.

It is well known that mercaptosilanes offer excellent coupling between rubber and silica, resulting in rubber compounds for tire treads with improved wet and ice skid resistance, rolling resistance and treadwear even at low loadings. For instance, U.S. Pat. No. 3,768,537 demonstrates the excellent compound properties that can be attained by the use of mercaptosilanes in silica loaded rubber compounds. However, as revealed by U.S. Pat. No. 6,433,065, the high reactivity of mercaptosilanes makes it impractical to use such silane coupling agents in applications where conventional Banbury mixing is employed. In cases where mercaptosilane coupling agents are used in silica compounds it is important to maintain a low temperatures (120° C. to 145° C.) to avoid premature crosslinking which proves to be a problem at higher temperatures. However, low mixing temperatures result in a marked reduction in the mechanical efficiency of mixing that is essential for an optimum dispersion of the silica. The longer mixing time at a low temperature results in a significant reduction in mixing productivity which in turn increases expense. Another drawback of using low temperatures for mixing without extended mixing duration is that less completed silanization occurs which results in the release of ethanol in downstream operations giving rise to porosity from the extrudate and reduced extrusion rates.

Using a combination of two silane coupling agents in silica compounds has been suggested in the patent literature. More specifically, U.S. Pat. No. 6,306,949 discloses the use of a combination of an organosilane disulfide and an organosilane tetrasulfide for silica compounds for enhanced processibility and improved compound properties. In such a process, the organosilane disulfide coupling agent is introduced during the non-productive stage of the mixing so that higher mixing temperatures can be used to mix the silica compounds to ensure a better dispersion of silica throughout the rubber compound. The organosilane tetrasulfide is introduced during the productive stage where the mixing temperature is low (100° C. to 120° C.) so that scorch of the compounds from premature crosslinking can be avoided. However, the very low temperature and short duration during the final pass of the mixing will not ensure sufficient silanization of the organosilane tertrasulfide in the silica compounds during compounding. Since the rate of silanization for tertrasulfide-type silane coupling agents is very low at a temperature lower than 120° C., ethanol is accordingly released during downstream operations, such as extrusions and curing.

U.S. Pat. No. 6,433,065 teaches the use of a small amount of a mercaptosilane coupling agent in combination with an allyl alkoxysilane for silica or silica/carbon black compounds in Banbury mixing. It is claimed that very high temperature mixing (170° C. to 185° C.) can be conducted without causing premature crosslinking of the compounds. U.S. Pat. No. 6,608,145 discloses the use of a small quantity of a organosilane tetrasulfide, bis(triethoxylsilylpropyl)tetrasulfide (TESPT) in combination with an allyl alkoxysilane. It is again claimed that very high temperatures (165° C. to 200° C.) could be used to mix silica or silica/carbon black compounds by Banbury mixing without causing premature crosslinking of the compounds. However, having a non-coupling silane (allyl alkoxysilane) in the silica compounds is not expected to enhance the interaction between silica and the polymeric chain, hence the performance of the silica compounds. U.S. Pat. No. 6,433,065 and U.S. Pat. No. 6,608,145 do not teach the use of mercaptosilane, singly or in combination with allyl alkoxysilane, for the preparation of silica masterbatches in a solvent system.

Different approaches are disclosed in the patent literature for the preparation of silica masterbatches. For Example, U.S. Pat. No. 5,985,953 reveals the preparation of emulsion styrene-butadiene rubber (e-SBR) based silica masterbatches. U.S. Pat. No. 6,433,064 discloses a rubber composition based on emulsion styrene-butadiene rubber and a two step process for making such a composition. U.S. Pat. No. 6,407,153, U.S. Pat. No. 6,420,456, and U.S. Pat. No. 6,323,260 describe processes by which silica particles are first treated with a compound containing amino and silane groups, followed by treatment with a silane compound containing a hydrophobic group. Similarly, U.S. Pat. No. 6,537,612 discloses a process through which the silica particles are treated with different chemical species to render the silica surface hydrophobic. The treated silica is then mixed with solution styrene-butadiene rubber or polybutadiene rubber cement to make elastomer masterbatches. However, an aqueous silica slurry is the starting material for the preparation of the silica masterbatch in all those approaches. Either the silica slurry is prepared by mixing water with silica or an aqueous silica slurry from the precipitated silica production process which is used directly in making silica masterbatches. Silica slurries are used in those approaches on the basis of the conventional thinking that because of the hydrophilic nature of silica, water would be the ideal medium for the treatment of the silica in the preparation of silica masterbatches.

It is well known to those skilled in the art that it is difficult for the silane coupling agents to react directly with silica in an aqueous medium. Hence, transfer agents are disclosed in U.S. Pat. No. 6,465,670 and French Patent 2,804,119 to increase the chance for the silane coupling agent to react with the silica surface. U.S. Pat. Nos. 6,407,153 and 6,420,456 disclose the use of amino silane with alkyl terminations before introducing silane coupling agents. In addition to being a more complex process, the introduction of other chemical species prior to silane coupling agents render some of the reactive sites on the silica surface unavailable for the silanization process.

U.S. Pat. No. 6,025,415 discloses a process through which silica powder could be rendered water-repellent and the dried water-repellent silica could be incorporated into solution elastomer cements in an organic solvent.

There continues to be a long felt need for silica filled rubber formulations that process better (have better extrusion quality) and which exhibit a higher level of dynamic stiffness. However, it is important for these objectives to be attained without compromising other desirable attributes of the silica filler rubber formulation, such as maintaining a low level of hysteresis. The use of silica reinforced tire tread compounds containing organofunctional silanes as coupling agents results in substantial performance benefits, including lower hysteresis and improved wet and ice traction. Unfortunately, these improvements in performance are usually accompanied by difficult tread compound processing due to high Mooney viscosity and reduced tire handling performance due to low dynamic stiffness at low strains of the cured rubber tread. Typical polysulfide silanes used in silica filled tire treads serve to hydrophobate the silica surface, reducing the silica "filler-filler" network resulting in a reduction of dynamic stiffness at low strain levels of the compound. Blocked mercaptosilanes (e.g., 3-octanoylthio-1-propyltriethoxysilane) further amplify this effect. Unlike silica filled tire tread compounds containing polysulfide silanes or blocked mercaptosilanes, carbon black filled tread compounds have high levels of dynamic stiffness at low strain due to the inherent "filler-filler" network formed by the carbon black. This high level of dynamic stiffness at low strain is advantageous for improved tire handling performance. However, this carbon black network also results in a substantial increase in hysteresis as compared to the silica/silane containing tread compounds. Furthermore, the high Mooney viscosity of the silica filled tire tread compounds often require the inclusion of a process additive that reduces the compound viscosity but also further reduces the low strain dynamic stiffness of the cured silica tread compound. Since low strain stiffness of the cured tread compound is a very important parameter for tire handling performance and since process additives reduce low strain dynamic stiffness, a way to increase in the low strain stiffness of a silica filled tread compound without a substantial detrimental increase in hysteresis is needed.

SUMMARY OF THE INVENTION

This invention is based upon the discovery that the silica compounding additives of this invention can be included in silica reinforced rubber formulations to increase the low strain dynamic stiffness exhibited by the rubber composition without a substantial increase in the cured compound hysteresis. This increase in low strain dynamic stiffness allows for use of process aids that would otherwise result in an unacceptable further reduction in the low strain dynamic stiffness. Increasing the low strain dynamic stiffness of the rubber formulation is beneficial in that it improves the handling performance of tires made therewith. Furthermore, the absence of a substantial increase in the hysteresis of the cured silica reinforced rubber formulation provides for retention of the beneficial property of low tire rolling resistance.

The present invention more specifically discloses a rubber formulation which is comprised of (1) a rubbery polymer, (2) a reinforcing silica, and (3) a silica compounding additive of the structural formula:

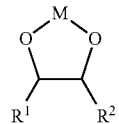

wherein M represents a divalent metal, and wherein $R^1$ and $R^2$ can be the same or different and are selected from the group consisting of hydrogen atoms, alkyl groups, alkylene groups, hydroxyl substituted alkyl or alkylene groups, amine substituted alkyl or alkylene groups and thiol substituted alkyl or alkylene groups.

The subject invention further reveals a tire which is comprised of a generally toroidal-shaped carcass with an outer circumferential tread, two spaced beads, at least one ply extending from bead to bead and sidewalls extending radially from and connecting said tread to said beads, wherein said tread is adapted to be ground-contacting, and wherein said tread is comprised of a rubber formulation which is comprised of (1) a rubbery polymer, (2) a reinforcing silica, and (3) a silica compounding additive of the structural formula:

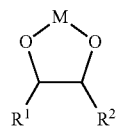

wherein M represents a divalent metal, and wherein $R^1$ and $R^2$ can be the same or different and are selected from the group consisting of hydrogen atoms, alkyl groups, alkylene groups, hydroxyl substituted alkyl or alkylene groups, amine substituted alkyl or alkylene groups and thiol substituted alkyl or alkylene groups.

DETAILED DESCRIPTION OF THE INVENTION

The silica compounding additives of this invention can be incorporated into virtually any type of rubbery polymer (elastomer). For instance, the rubbery polymer can be natural rubber, synthetic polyisoprene rubber, polybutadiene rubber, isoprene-butadiene rubber (IBR), styrene butadiene rubber (SBR), styrene-isoprene rubber (SIR), styrene-isoprene-butadiene rubber (SIBR), or some other type of conventional polydiene rubber.

Further representative of such rubbery polymers (elastomers) are functionalized elastomers that contain chemical moieties that increase interaction between the polymer and the silica surface. Such moieties are present at the polymer chain ends or along the polymer chain. Such moieties include, for example, carboxyl, hydroxyl, ether, polyether, epoxy, glycidyl ether, ester, silanol, silane, sulfide, thiol and combinations thereof. Functionalized organic solution polymerization prepared styrene/butadiene copolymers (functionalized S-SBR's) and functionalized organic solution polymerization prepared cis 1,4-polybutadiene elastomers may also be used.

Additional representative of such elastomers and functionalized elastomers are, for example, organic solution polymerization prepared tin or silicon coupled or terminated elastomers such as, for example, tin or silicon coupled styrene/butadiene copolymers may also be used. Tin and silicon coupled copolymers of styrene/butadiene may be prepared, for example, by introducing a tin or silicon coupling agent such as tin tetrachloride, silicon tetrachloride, alkyl tin trichloride, alkyl silicon trichloride, dialkyl tin dichloride, dialkyl silicon dichloride, trialkyl tin monochloride or trialkyl silicon monochloride during the styrene/1,3-butadiene monomer copolymerization reaction in an organic solvent solution, usually at or near the end of the polymerization reaction.

The silica utilized in the rubber formulations of this invention can include pyrogenic siliceous pigments, precipitated siliceous pigments and highly dispersible precipitated silicas, although highly dispersible precipitated silicas are preferred. The siliceous pigments preferably employed in this invention are precipitated silicas such as, for example, those obtained by the acidification of a soluble silicate, e.g., sodium silicate. As a general rule, the silica will have an average particle size that is within the range of about 4 nm to 120 nm, and will preferably have a particle size that is within the range of 7 nm to 60 nm. Such silicas might be characterized, for example, by having a BET surface area, as measured using nitrogen gas, preferably in the range of about 40 to about 600, and more usually in a range of about 50 to about 300 square meters per gram. The silica will preferably have a BET surface area that is within the range of about 125 m²/g to about 250 m²/g. The BET method of measuring surface area is described in the Journal of the American Chemical Society, Volume 60, page 304 (1930).

The silica may also be typically characterized by having a dibutylphthalate (DBP) absorption value in a range of about 100 to about 400 ml/100 g, and more usually about 150 to about 300 ml/100 g. The silica might be expected to have an average ultimate particle size, for example, in the range of 0.01 to 0.05 micron as determined by the electron microscope, although the silica particles may be even smaller, or possibly larger, in size.

Various commercially available silicas may be considered for use in the practice of this invention. Some representative examples of silica that can be used in the practice of this invention includes, but is not limited to, silicas commercially available from PPG Industries under the Hi-Sil trademark, such as Hi-Sil® 210, Hi-Sil® 233 and Hi-Sil® 243, silicas commercially available from PPG Industries under the Agilon® trademark, such as Agilon® 400G, Agilon® 454G and Agilon® 458G, silicas available from Solvay, with, for example, designations of Zeosil®1085Gr, Zeosil®1115MP, Zeosil®1165MP, Zeosil® Premium and ZHRS®1200MP, and silicas available from Evonik Industries with, for example, designations Ultrasil® 5000GR, Ultrasil® 7000GR, Ultrasil® VN2, Ultrasil® VN3, and BV9000GR, and silicas available from Huber Engineered Materials with, for example, designations of Zeopol® 8745, and Zeopol® 8755LS.

The silica coupling agent will typically be a compound of the formula:

Z-Alk-S$_n$-Alk-Z    (I)

Z-Alk-S$_n$-Alk    (II)

Z-Alk-SH    (III)

Z-Alk    (IV)

Si(OR$^1$)$_4$    (V)

in which Z is selected from the group consisting of:

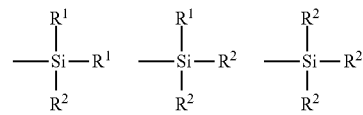

wherein R$^1$ is an alkyl group containing from 1 to 4 carbon atoms, a cyclohexyl group, or a phenyl group; wherein R$^2$ is an alkoxy group containing from 1 to 8 carbon atoms, or a cycloalkoxy group containing from 5 to 8 carbon atoms; wherein Alk is a divalent hydrocarbon of 1 to 18 carbon atoms and wherein n represents an integer from 2 to 8. The mercaptosilanes and blocked mercaptosilanes that can be used in the practice of this invention are described in International Patent Publication No. WO 2006/076670. The teachings of WO 2006/076670 are incorporated herein by reference for the purpose of describing specific mercaptosilanes and blocked mercaptosilanes that can be used in the practice of this invention. The teachings of WO 03091314 are also incorporated herein by reference for the purpose of describing specific silanes that can be utilized in the practice of this invention which emit low levels of volatile organic compounds or no volatile organic compounds.

Specific examples of sulfur containing organosilicon compounds which may be used as the silica coupling agent in accordance with the present invention include: 3,3'-bis(trimethoxysilylpropyl) disulfide, 3,3'-bis(triethoxysilylpropyl) tetrasulfide, 3,3'-bis(triethoxysilylpropyl) octasulfide, 3,3'-bis(trimethoxysilylpropyl) tetrasulfide, 2,2'-bis(triethoxysilylethyl) tetrasulfide, 3,3'-bis(trimethoxysilylpropyl) trisulfide, 3,3'-bis(triethoxysilylpropyl) trisulfide, 3,3'-bis(tributoxysilylpropyl) disulfide, 3,3'-bis(trimethoxysilylpropyl) hexasulfide, 3,3'-bis(trimethoxysilylpropyl) octasulfide, 3,3'-bis(trioctoxysilylpropyl) tetrasulfide, 3,3'-bis(trihexoxysilylpropyl) disulfide, 3,3'-bis(tri-2"-ethylhexoxysilylpropyl) trisulfide, 3,3'-bis(triisooctoxysilylpropyl) tetrasulfide, 3,3'-bis(tri-t-butoxysilylpropyl) disulfide, 2,2'-bis(methoxy diethoxy silyl ethyl) tetrasulfide, 2,2'-bis(tripropoxysilylethyl) pentasulfide, 3,3'-bis(tricyclonexoxysilylpropyl) tetrasulfide, 3,3'-bis(tricyclopentoxysilylpropyl) trisulfide, 2,2'-bis(tri-2"-methylcyclohexoxysilylethyl) tetrasulfide, bis(trimethoxysilylmethyl) tetrasulfide, 3-methoxy ethoxy propoxysilyl 3'-diethoxybutoxy-silylpropyltetrasulfide, 2,2'-bis(dimethyl methoxysilylethyl) disulfide, 2,2'-bis(dimethyl sec.butoxysilylethyl) trisulfide, 3,3'-bis(methyl butylethoxysilylpropyl) tetrasulfide, 3,3'-bis(di t-butylmethoxysilylpropyl) tetrasulfide, 2,2'-bis(phenyl methyl methoxysilylethyl) trisulfide, 3,3'-bis(diphenyl isopropoxysilylpropyl) tetrasulfide, 3,3'-bis(diphenyl cyclohexoxysilylpropyl) disulfide, 3,3'-bis(dimethyl ethylmercaptosilylpropyl) tetrasulfide, 2,2'-bis(methyl dimethoxysilylethyl) trisulfide, 2,2'-bis (methyl ethoxypropoxysilylethyl) tetrasulfide, 3,3'-bis (diethyl methoxysilylpropyl) tetrasulfide, 3,3'-bis(ethyl di-sec.butoxysilylpropyl) disulfide, 3,3'-bis(propyl diethoxysilylpropyl) disulfide, 3,3'-bis(butyl dimethoxysilylpropyl) trisulfide, 3,3'-bis(phenyl dimethoxysilylpropyl) tetrasulfide, 3-phenyl ethoxybutoxysilyl 3'-trimethoxysilylpropyl tetrasulfide, 4,4'-bis(trimethoxysilylbutyl) tetrasulfide, 6,6'-bis(triethoxysilylhexyl) tetrasulfide, 12,12'-bis(triisopropoxysilyl dodecyl) disulfide, 18,18'-bis(trimethoxysilyloctadecyl) tetrasulfide, 18,18'-bis(tripropoxysilyloctadecenyl) tetrasulfide, 4,4'-bis(trimethoxysilyl-buten-2-yl) tetrasulfide, 4,4'-bis(trimethoxysilylcyclohexylene) tetrasulfide, 5,5'-bis (dimethoxymethylsilylpentyl) trisulfide, 3,3'-bis(trimethoxysilyl-2-methylpropyl) tetrasulfide, 3,3'-bis(dimethoxyphenylsilyl-2-methylpropyl) disulfide, (3-Mercaptopropyl) trimethoxysilane, (3-Mercaptopropyl)triethoxysilane and 3-(Triethoxysilyl)propyl thiooctanoate.

The preferred sulfur containing organosilicon compounds are the 3,3'-bis(trimethoxy or triethoxy silylpropyl) sulfides. The most preferred compound is 3,3'-bis(triethoxysilylpropyl) tetrasulfide. Therefore, with respect to formula I, Z is preferably

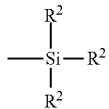

wherein $R^2$ is an alkoxy of 2 to 4 carbon atoms, with 2 carbon atoms being particularly preferred; Alk is a divalent hydrocarbon of 2 to 4 carbon atoms with 3 carbon atoms being particularly preferred; and n is an integer of from 3 to 5 with 4 being particularly preferred.

The amount of the silica coupling agent that should be incorporated into the elastomeric compositions of this invention will vary depending on the level of the siliceous fillers that are included in the rubbery composition. Generally speaking, the amount of the silica coupling agent used will range from about 0.01 to about 15 parts by weight per hundred parts by weight of the siliceous fillers. Preferably, the amount of silica coupling agent utilized will range from about 1 to about 12 parts by weight per hundred parts by weight of the siliceous fillers. Preferably, the amount of silica coupling agent utilized will range from about 2 to about 10 parts by weight per hundred parts by weight of the siliceous fillers. More preferably the amount of the silica coupling agent included in the elastomeric compositions of this invention will range from about 6 to about 10 parts by weight per hundred parts by weight of the siliceous fillers.

The rubbery compositions of this invention can be compounded utilizing conventional ingredients and standard techniques. For instance, the elastomeric compositions of this invention will typically be mixed with carbon black, sulfur, additional fillers, accelerators, oils, waxes, scorch inhibiting agents, and processing aids in addition to the reinforcing silica filler.

In most cases, the elastomeric compositions of this invention will be compounded with sulfur and/or a sulfur containing compound, at least one filler, at least one accelerator, at least one antidegradant, at least one processing oil, zinc oxide, optionally a hydrocarbon resin, optionally a reinforcing resin, optionally one or more fatty acids, optionally a peptizer and optionally one or more scorch inhibiting agents. Such elastomeric compositions will normally contain from about 0.5 to 5 phr (parts per hundred parts of rubber by weight) of sulfur and/or a sulfur containing compound with 1 phr to 2.5 phr being preferred. It may be desirable to utilize insoluble sulfur in cases where bloom is a problem.

Normally the total amount of fillers utilized in the elastomeric blends of this invention will be within the range of 10 phr to 150 phr with it being preferred for such blends to contain from 30 phr to 100 phr fillers. As has been explained, the filler can be comprised solely of the reinforcing silica filler. However, in most cases at least some carbon black will be utilized in such elastomeric compositions. If carbon black is also present, the amount and type of carbon black, if used, may vary. Generally speaking, the amount of carbon black will vary from about 1 phr to about 80 phr. Preferably, the amount of carbon black will range from about 3 phr to about 50 phr. Clays and/or talc can be included in the filler to reduce cost. Starch can also be included to attain good results in some cases. In any case, the blend will also normally include from 0.1 to 2.5 phr of at least one accelerator with 0.2 phr to 1.5 phr being preferred. Antidegradants, such as antioxidants and antiozonants, will generally be included in the rubbery blends of this invention in amounts ranging from 0.25 phr to 10 phr with amounts in the range of 1 phr to 5 phr being preferred. Processing oils can be included in the blend to improve processing and reduce compound modulus although some blends, especially those based on natural rubber, may contain no processing oil. Processing oils, when present, will generally be included in the blend in amounts ranging from 2 phr to 100 phr with amounts ranging from 5 phr to 50 phr being preferred. Zinc oxide can be included in the blend as a cure activator but in some cases may not be present. Zinc oxide, when present, will normally be included in the blends from 0.5 phr to 10 phr of zinc oxide with 1 to 5 phr being preferred. These blends can optionally contain up to about 15 phr of hydrocarbon resins, up to about 10 phr of reinforcing resins, up to about 10 phr of fatty acids, up to about 10 phr of processing aid, up to about 2.5 phr of peptizers, and up to about 1 phr of scorch inhibiting agents.

Examples of processing aids that are suitable for this purpose are: fatty acids, fatty alcohols, fatty amines, fatty amides, fatty esters, fatty acid metal salts, polyols, polyethylene glycols, polypropylene glycols and natural or synthetic hydrocarbon waxes and combinations and blends thereof.

Examples of hydrocarbon resins that are suitable for this purpose are: asphalt, bitumen, indene-coumarone resins, C9 resins, C5 resins, C5/C9 resins, alkylated hydrocarbon resins, aromatic petroleum resins, styrene resins, alpha-methylstyrene resins, styrene-alpha-methyl-styrene copolymer resins, phenolic tackifying resins, dicyclopentadiene (DCPD) resins, terpene resins, polybutene resins, rosin acids, rosin esters, dimerized rosin resins and combinations and blends thereof, etc. For example, and not intended to be limiting, see U.S. Pat. No. 6,525,133; U.S. Pat. No. 6,242,523; U.S. Pat. No. 6,221,953 and U.S. Pat. No. 5,901,766.

The silica compounding additives of this invention are of the structural formula:

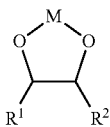

wherein M represents a divalent metal, and wherein $R^1$ and $R^2$ can be the same or different and are selected from the group consisting of hydrogen atoms, alkyl groups, alkylene groups, hydroxyl substituted alkyl or alkylene groups, amine substituted alkyl or alkylene groups and thiol substituted alkyl or alkylene groups. In most cases, M will be selected from the group consisting of zinc, calcium and magnesium. For instance, $R^1$ can represent a hydrogen atom and $R^2$ can represent an alkyl group containing from 1 to 20 carbon atoms. In the alternative, $R^1$ can represent a hydrogen atom and $R^2$ can represent an alkyl group containing from 6 to 18 carbon atoms. In the case of M being zinc or magnesium, the silica compounding additive can be of the structural formula:

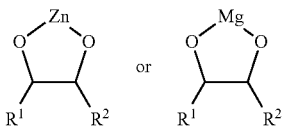

wherein $R^1$ and $R^2$ can be the same or different and are selected from the group consisting of hydrogen atoms, alkyl groups, alkylene groups, hydroxyl substituted alkyl or alkylene groups, amine substituted alkyl or alkylene groups and thiol substituted alkyl or alkylene groups. For instance, the silica compounding additive can be zinc glycerolate, calcium glycerolate or magnesium glycerolate. Zinc glycerolate is of the structural formula:

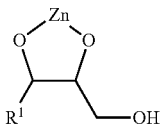

wherein $R^1$ represents a hydrogen atom.

The silica compounding additive of this invention can be mixed into a desired rubber formulation utilizing any conventional procedure which results in thorough mixing to attain any essentially homogeneous formulation. For instance, the silica compounding additive can be blended into the rubber formulation with a banbury mixer, a mill mixer, an extruder, a continuous mixer or the like. In some embodiments of this invention the silica compounding additive can be introduced into the rubbery polymer as a masterbatch. For instance, the silica compounding additive can be pre-blended into any desired rubbery polymer, filler, processing aid, hydrocarbon resin, process oil or combinations thereof. The silica compounding additive can be blended into the rubbery polymer during either the non-productive or productive mixing stage utilized in preparing the rubber formulation. However, to maximize mixing time and to attain the best possible dispersion, it is typically advantageous to add the silica compounding additive during the non-productive mixing stage utilized in making the rubber formulation.

This invention is illustrated by the following examples that are merely for the purpose of illustration and are not to be regarded as limiting the scope of the invention or the manner in which it can be practiced. Unless specifically indicated otherwise, parts and percentages are given by weight.

Example 1

In this experiment, zinc glycerolate was added to a series of rubber compositions which contained a 70/30 blend of solution SBR and high-cis polybutadiene. The zinc glycerolate was added at a level shown in Table 1. The zinc glycerolate was added in the first non-productive mixing stage utilized in making this series of rubber formulations. After being cured utilized a conventional sulfur cure package, the rubber formulations were tested to determine physical and chemical properties. The results of this testing is again shown in Table 1.

TABLE 1

|  | Sample | | | | | |
| --- | --- | --- | --- | --- | --- | --- |
|  | A | B | C | D | E | F |
| Non-Productive Mix Stage 1 | | | | | | |
| Solution SBR Elastomer[1] | 96.25 | 96.25 | 96.25 | 96.25 | 96.25 | 96.25 |
| Solution BR Elastomer[2] | 30 | 30 | 30 | 30 | 30 | 30 |
| Carbon Black[3] | 5 | 5 | 5 | 5 | 5 | 5 |
| Silica[4] | 50 | 50 | 50 | 50 | 50 | 50 |
| Coupling Agent[5] | 4 | 4 | 4 | 4 | 4 | 4 |
| Oil | 4 | 4 | 4 | 4 | 4 | 4 |
| Stearic Acid | 1 | 1 | 1 | 1 | 1 | 1 |
| Zinc Glycerolate | — | 0.25 | 0.5 | 1 | 2 | 5 |
| Non-Productive Mix Stage 2 | | | | | | |
| Silica[4] | 30 | 30 | 30 | 30 | 30 | 30 |
| Coupling Agent[5] | 2.4 | 2.4 | 2.4 | 2.4 | 2.4 | 2.4 |
| Oil | 3 | 3 | 3 | 3 | 3 | 3 |
| 6-PPD[6] | 2 | 2 | 2 | 2 | 2 | 2 |
| ZnO[7] | 2.5 | 2.5 | 2.5 | 2.5 | 2.5 | 2.5 |
| Microcrystalline Wax | 3 | 3 | 3 | 3 | 3 | 3 |

TABLE 1-continued

| | Sample | | | | | |
|---|---|---|---|---|---|---|
| | A | B | C | D | E | F |
| Productive Mix Stage | | | | | | |
| Sulfur | 1.7 | 1.7 | 1.7 | 1.7 | 1.7 | 1.7 |
| CBS | 1.75 | 1.75 | 1.75 | 1.75 | 1.75 | 1.75 |
| DPG | 2.5 | 2.5 | 2.5 | 2.5 | 2.5 | 2.5 |
| Mooney | | | | | | |
| Plasticity ML1 + 4 at 100° C. | 113.38 | 109.04 | 106.19 | 104.16 | 101.88 | 96.59 |
| Scorch Ts5 | 10.81 | 9.88 | 15.10 | 19.17 | 23.70 | 27.55 |
| RPA, Cured Compound | | | | | | |
| G' at 1% Strain, 60° C. (MPa) | 4.13 | 4.37 | 4.67 | 4.62 | 4.37 | 4.51 |
| G' at 50% Strain, 60° C. (MPa) | 1.40 | 1.37 | 1.35 | 1.35 | 1.35 | 1.36 |
| Tan Delta max (at 15% strain) | 0.132 | 0.137 | 0.135 | 0.141 | 0.129 | 0.134 |

[1]Solution SBR that had a bound styrene content of 40%, a vinyl content of 24%, and a glass transition temperature (Tg) of −28.9° C. (SPRINTAN SLR 6430)
[2]Solution high cis-1,4-polybutadiene polymer from Lanxess had a cis-1,4 microstructure content of at least 96%
[3]N234 Carbon Black
[4]Ultrasil 7000GR highly dispersible silica from Evonik
[5]TESPT coupling agent ("Si69" from Degussa)
[6]N-1,3-dimethylbutyl-N-phenyl-para-phenylenediamine (6PPD from HB Chemicals)
[7]Zinc Oxide (Industrial grade-Zochem)

As can be seen by reviewing Table 1, G' at 1% strain increased with increasing quantities of zinc glycerolate until a maximum G' was attained with the addition of 0.5 phr of the zinc glycerolate. Accordingly, this series of experiments shows that the zinc glycerolate was effective at increasing G' at 1% strain. It should also be noted that the addition of the zinc glycerolate did not substantially increase tan delta max values. Accordingly, the addition of the zinc glycerolate does not compromise hysteresis exhibited by the rubber formulation. Thus, the zinc glycerolate can be used advantageously to increase the stiffness of the compound without increasing hysteresis. These experiments show that zinc glycerolate can be used in silica reinforced tire tread formulations to improve tire handling performance without sacrificing tire rolling resistance performance (without being detrimental to fuel economy).

Example 2

In this experiment, zinc glycerolate was added to a series of rubber compositions which contained a 70/30 blend of solution SBR and high-cis polybutadiene with 80 phr of 200 m2/g highly dispersible silica. The zinc glycerolate was added at a level shown in Table 2. The zinc glycerolate was added in the first non-productive mixing stage utilized in making this series of rubber formulations. After being cured utilizing a conventional sulfur cure package, the rubber formulations were tested to determine physical and chemical properties. The results of this testing is again shown in Table 2.

TABLE 2

| SAMPLE | A | B | C | D | E |
|---|---|---|---|---|---|
| Non-Productive Mix Stage 1 | | | | | |
| Solution SBR Elastomer[1] | 96.25 | 96.25 | 96.25 | 96.25 | 96.25 |
| Solution Neodymium BR Elastomer[2] | 30 | 30 | 30 | 30 | 30 |
| Silica[3] | 50 | 50 | 50 | 50 | 50 |
| Coupling Agent[4] | 5 | 5 | 5 | 5 | 5 |
| Zinc Glycerolate | — | 0.2 | 0.5 | 1 | 2 |

TABLE 2-continued

| SAMPLE | A | B | C | D | E |
|---|---|---|---|---|---|
| Microcrystalline Wax (163/169) | 3 | 3 | 3 | 3 | 3 |
| TDAE Oil | 5 | 5 | 5 | 5 | 5 |
| Non-Productive Mix Stage 2 | | | | | |
| Silica[3] | 20 | 20 | 20 | 20 | 20 |
| Coupling Agent[4] | 2 | 2 | 2 | 2 | 2 |
| TDAE Oil | 5 | 5 | 5 | 5 | 5 |
| Non-Productive Mix Stage 3 | | | | | |
| Carbon Black[5] | 5 | 5 | 5 | 5 | 5 |
| Stearic Acid | 1 | 1 | 1 | 1 | 1 |
| 6-PPD[6] | 2 | 2 | 2 | 2 | 2 |
| ZnO[7] | 2.5 | 2.5 | 2.5 | 2.5 | 2.5 |
| Productive Mix Stage | | | | | |
| Sulfur | 1 | 1 | 1 | 1 | 1 |
| TBBS | 2 | 2 | 2 | 2 | 2 |
| DPG | 2 | 2 | 2 | 2 | 2 |
| Mooney | | | | | | |
| Plasticity ML1 + 4 at 100° C. | 77.7 | 73.7 | 75.2 | 73.1 | 71.1 |
| Scorch Ts5 | 26.9 | 27.5 | >30 | >30 | >30 |
| RPA, Cured Compound | | | | | |
| G' at 1% Strain, 60° C. (MPa) | 1.67 | 1.66 | 1.83 | 1.72 | 1.62 |
| G' at 50% Strain, 60° C. (MPa) | 0.87 | 0.88 | 0.89 | 0.88 | 0.87 |
| Tan-Delta max (at 15% strain) | 0.15 | 0.14 | 0.15 | 0.14 | 0.13 |

[1]Solution SBR having a mooney viscosity ML 1 + 4 (100° C.) of 55, styrene percentage of 25%, a vinyl content of 62%, and a Tg of −28° C. (SPRINTAN ™ SLR 4630 from Trinseo)
[2]Solution neodymium high-cis 1,4 polybutadiene containing a 96% minimum cis 1,4 microstructure. (Buna ® CB 24 from Lanxess)
[3]Highly dispersible silica having a CTAB surface area of 200 m2/g. (Zeosil ® Premium 200MP highly dispersible silica from Solvay)
[4]Bis(triethoxysilylpropyl)tetrasulfide silane coupling agent. (Si 69 ® from Evonik)
[5]N234 Carbon Black
[6]N-1,3-dimethylbutyl-N-phenyl-para-phenylenediamine (6-PPD)
[7]Zinc Oxide (Industrial grade from Zochem)

As can be seen by reviewing Table 2, G' at 1% strain increased with increasing quantities of zinc glycerolate until a maximum G' was attained with the addition of 0.5 phr of the zinc glycerolate. Accordingly, this series of experiments shows that the zinc glycerolate was effective at increasing G' at 1% strain. It should also be noted that the addition of the zinc glycerolate did not substantially increase tan delta max values. Accordingly, the addition of the zinc glycerolate does not compromise hysteresis exhibited by the rubber formulation. Thus, the zinc glycerolate can be used advantageously to increase the stiffness of the compound without increasing hysteresis. These experiments show that zinc glycerolate can be used in silica reinforced tire tread formulations to improve tire handling performance without sacrificing tire rolling resistance performance (without being detrimental to fuel economy).

While certain representative embodiments and details have been shown for the purpose of illustrating the subject invention, it will be apparent to those skilled in this art that various changes and modifications can be made therein without departing from the scope of the subject invention.

What is claimed is:

1. A rubber formulation which is comprised of (1) a rubbery polymer, (2) a reinforcing silica, and (3) a silica compounding additive of the structural formula:

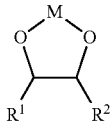

wherein M represents a divalent metal, and wherein $R^1$ and $R^2$ can be the same or different and are selected from the group consisting of hydrogen atoms, alkyl groups, alkylene groups, hydroxyl substituted alkyl or alkylene groups, amine substituted alkyl or alkylene groups and thiol substituted alkyl or alkylene groups, wherein the silica compounding additive is present at a level which is within the range of about 0.2 phr to 2 phr, and wherein the silica compounding additive is further comprised of a member selected from the group consisting of fatty alcohols, fatty amines, fatty amides, fatty esters, fatty acid metal salts, and polyols.

2. The rubber formulation as specified in claim 1 which is further comprised of a silica coupling agent.

3. The rubber formulation as specified in claim 1 wherein M represents zinc.

4. The rubber formulation as specified in claim 1 wherein $R^1$ represents a hydrogen atom and $R^2$ represents an alkyl group or a hydroxyl substituted alkyl group.

5. The rubber formulation as specified in claim 1 wherein the silica compounding additive is zinc glycerolate.

6. The rubber formulation as specified in claim 1 wherein the silica compounding additive is present at a level which is within the range of about 0.5 phr to about 1.5 phr.

7. The rubber formulation as specified in claim 1 wherein the silica compounding additive is further comprised of a fatty acid metal salt.

8. The rubber formulation as specified in claim 1 wherein the silica compounding additive is further comprised of a fatty amide.

9. The rubber formulation as specified in claim 1 wherein the silica compounding additive is further comprised of a fatty ester.

10. The rubber formulation as specified in claim 1 wherein the silica compounding additive is further comprised of a polyol.

11. The rubber formulation as specified in claim 1 wherein the rubbery polymer is selected from the group consisting of natural rubber, synthetic polyisoprene rubber, polybutadiene rubber, isoprene-butadiene rubber, styrene butadiene rubber, styrene-isoprene rubber, and styrene-isoprene-butadiene rubber.

12. The rubber formulation as specified in claim 11 wherein the rubbery polymer is an organic solution polymerization prepared functionalized elastomer.

13. The rubber formulation as specified in claim 1 wherein the silica compounding additive is further comprised of a processing aid or a hydrocarbon resin.

14. The rubber formulation as specified in claim 1 wherein the silica compounding additive is further comprised of a silica coupling agent.

15. The rubber formulation as specified in claim 1 wherein the silica compounding additive is further comprised of a second rubbery polymer.

16. A tire which is comprised of a generally toroidal-shaped carcass with an outer circumferential tread, two spaced beads, at least one ply extending from bead to bead and sidewalls extending radially from and connecting said tread to said beads, wherein said tread is adapted to be ground-contacting, and wherein said tread is comprised of the rubber formulation as specified in claim 1.

17. A rubber formulation which is comprised of (1) a rubbery polymer, (2) a reinforcing silica, and (3) a silica compounding additive of the structural formula:

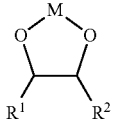

wherein M represents magnesium, and wherein $R^1$ and $R^2$ can be the same or different and are selected from the group consisting of hydrogen atoms, alkyl groups, alkylene groups, hydroxyl substituted alkyl or alkylene groups, amine substituted alkyl or alkylene groups and thiol substituted alkyl or alkylene groups.

18. The rubber formulation as specified in claim 17 wherein the silica compounding additive is magnesium glycerolate.

19. A rubber formulation which is comprised of (1) a rubbery polymer, (2) a reinforcing silica, and (3) a silica compounding additive of the structural formula:

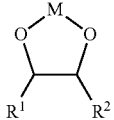

wherein M represents calcium, and wherein $R^1$ and $R^2$ can be the same or different and are selected from the group consisting of hydrogen atoms, alkyl groups, alkylene groups, hydroxyl substituted alkyl or alkylene groups, amine substituted alkyl or alkylene groups and thiol substituted alkyl or alkylene groups.

20. The rubber formulation as specified in claim 19 wherein the silica compounding additive is calcium glycerolate.

21. A rubber formulation which is comprised of (1) a rubbery polymer, (2) a reinforcing silica, and (3) a silica compounding additive of the structural formula:

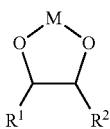

wherein M represents a divalent metal, and wherein $R^1$ and $R^2$ can be the same or different and are selected from the group consisting of hydrogen atoms, alkyl groups, alkylene groups, hydroxyl substituted alkyl or alkylene groups, amine substituted alkyl or alkylene groups and thiol substituted alkyl or alkylene groups, wherein the silica compounding additive is present at a level which is within the range of about 0.2 phr to 2 phr, wherein the rubbery polymer is an organic solution polymerization prepared tin or silicon coupled elastomer.

22. A rubber formulation which is comprised of (1) a rubbery polymer, (2) a reinforcing silica, and (3) a silica compounding additive of the structural formula:

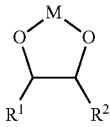

wherein M represents a divalent metal, and wherein $R^1$ and $R^2$ can be the same or different and are selected from the group consisting of hydrogen atoms, alkyl groups, alkylene groups, hydroxyl substituted alkyl or alkylene groups, amine substituted alkyl or alkylene groups and thiol substituted alkyl or alkylene groups, wherein the silica compounding additive is present at a level which is within the range of about 0.2 phr to 2 phr, wherein the silica compounding additive is further comprised of a fatty alcohol.

23. A rubber formulation which is comprised of (1) a rubbery polymer, (2) a reinforcing silica, and (3) a silica compounding additive of the structural formula:

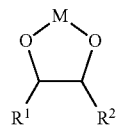

wherein M represents a divalent metal, and wherein $R^1$ and $R^2$ can be the same or different and are selected from the group consisting of hydrogen atoms, alkyl groups, alkylene groups, hydroxyl substituted alkyl or alkylene groups, amine substituted alkyl or alkylene groups and thiol substituted alkyl or alkylene groups, wherein the silica compounding additive is present at a level which is within the range of about 0.2 phr to 2 phr, wherein the silica compounding additive is further comprised of a fatty amine.

* * * * *